United States Patent [19]

McCabe

[11] 4,263,930

[45] Apr. 28, 1981

[54] DIFFUSER CONCEALABLE, VOLUME CONTROL, HEAT-RESPONSIVE, SEMI-AUTOMATIC RESETTING, BUTTERFLY DAMPER AND OPERATOR

[75] Inventor: Francis J. McCabe, Doylestown, Pa.

[73] Assignee: Prefco Products, Inc., Buckingham, Pa.

[21] Appl. No.: 900,620

[22] Filed: Apr. 27, 1978

Related U.S. Application Data

[63] Continuation-in-part of Ser. No. 896,299, Apr. 14, 1978, Pat. No. 4,195,384, Ser. No. 896,237, Apr. 14, 1978, Ser. No. 792,525, May 2, 1977, Pat. No. 4,146,048, and Ser. No. 764,774, Feb. 2, 1977, Pat. No. 4,114,646, which is a continuation of Ser. No. 689,994, May 26, 1976, Pat. No. 4,081,173, said Ser. No. 896,299, is a continuation-in-part of Ser. No. 779,044, Mar. 18, 1977, Pat. No. 4,099,292, which is a continuation-in-part of Ser. No. 676,483, Apr. 13, 1976, Pat. No. 4,041,570, and Ser. No. 676,413, Apr. 13, 1976, Pat. No. 4,040,304.

[51] Int. Cl.[3] .......... F16K 17/38

[52] U.S. Cl. .......... 137/80; 49/2; 98/1; 137/601; 251/251

[58] Field of Search .......... 49/2; 160/1, 6; 16/48.5; 169/56; 137/75, 67, 77, 79, 80; 98/1, 86

[56] References Cited

U.S. PATENT DOCUMENTS

| | | | |
|---|---|---|---|
| 2,148,530 | 2/1939 | Burke | 126/287.5 X |
| 3,009,473 | 11/1961 | Hennen | 251/212 X |
| 3,337,991 | 8/1967 | Adams | 98/86 X |
| 3,467,163 | 9/1969 | Vassaux | 160/1 |
| 3,495,606 | 2/1970 | Phillips | 98/86 X |
| 3,720,153 | 3/1973 | Jardinier et al. | 98/86 |
| 3,725,972 | 4/1973 | McCabe | 16/48.5 |
| 3,734,114 | 5/1973 | Phillips | 160/1 |
| 3,796,248 | 3/1974 | McCabe | 160/1 |
| 3,814,165 | 6/1974 | McCabe | 160/207 |
| 3,866,657 | 2/1975 | McCabe | 160/181 |
| 3,889,314 | 6/1975 | McCabe | 16/48.5 |
| 3,899,156 | 8/1975 | McCabe | 98/86 X |
| 3,921,900 | 11/1975 | Cole | 137/601 X |
| 4,080,978 | 3/1978 | McCabe | 137/601 X |
| 4,081,173 | 3/1978 | McCabe | 137/601 X |
| 4,146,048 | 3/1979 | McCabe | 137/512.1 X |

FOREIGN PATENT DOCUMENTS

| | | | |
|---|---|---|---|
| 2307228 | 11/1976 | France | 137/75 |

*Primary Examiner*—Martin P. Schwadron
*Assistant Examiner*—Richard Gerard
*Attorney, Agent, or Firm*—Benasutti Associates, Ltd.

[57] ABSTRACT

A novel operator is disclosed for use in combination with a butterfly fire and volume control damper, which operator may be concealed behind a standard concentric diffuser. Only a screwdriver aperture need be provided in the diffuser to facilitate volume adjustment or resetting of the bufferfly damper. In response to excessive heat in the vicinity of the damper, or alternatively, in response to a remote signal received by the operator, the blades of the damper will move to their fully closed position. Once activation conditions have passed, a screwdriver is used to reset the damper to resume its volume control function.

29 Claims, 5 Drawing Figures

DIFFUSER CONCEALABLE, VOLUME CONTROL, HEAT-RESPONSIVE, SEMI-AUTOMATIC RESETTING, BUTTERFLY DAMPER AND OPERATOR

CROSS-REFERENCE TO RELATED APPLICATIONS

The present application is a continuation-in-part of my prior co-pending patent application Ser. No. 792,525, filed May 2, 1977 entitled, "Butterfly Damper", now U.S. Pat. No. 4,146,048, dated Mar. 27, 1979, which application is incorporated by reference as if fully set forth herein.

The present application is also a continuation-in-part of my prior co-pending patent application entitled "Self-Resetting, Cable Operated Translating Drive Link," Ser. No. 896,299, filed Apr. 14, 1978, now U.S. Pat. No. 4,195,384, dated Apr. 1, 1980, which in turn is a continuation-in-part of my prior co-pending patent application Ser. No. 779,044, filed Mar. 18, 1977 entitled, "Telescoping Heat Responsive Releasing Means," now U.S. Pat. No. 4,099,292, dated July 11, 1978, which in turn is a continuation-in-part of my prior co-pending patent application entitled, "Resettable Heat Actuatable Fire Link," Ser. No. 676,483, filed Apr. 13, 1976, now U.S. Pat. No. 4,041,570, dated Aug. 16, 1977, as well as a continuation-in-part of my prior co-pending patent application entitled, "Clutch Motor For Use In Resettable Fire Damper," Ser. No. 676,413, filed Apr. 13, 1976, now U.S. Pat. No. 4,040,304, dated Aug. 9, 1977, which applications are incorporated herein by reference as if fully set forth herein.

The present application is also a continuation-in-part of my prior co-pending patent application Ser. No. 764,774, filed Feb. 2, 1977 entitled, "Rotating Blade Fire Damper," now U.S. Pat. No. 4,114,646, dated Sept. 17, 1977, which in turn is a continuation of application Ser. No. 689,994, filed May 26, 1976 entitled, "Rotating Blade Fire Damper," now U.S. Pat. No. 4,081,173, dated Mar. 28, 1978, which applications are also incorporated by reference as if fully set forth herein.

The present application is also a continuation-in-part of my prior co-pending patent application entitled, "Electro-Thermal, Fire Protection Locking Clip," Ser. No. 896,237, filed Apr. 14, 1978, said application having been allowed on Mar. 28, 1980, which application is also specifically incorporated herein by reference.

BACKGROUND OF THE INVENTION

The present invention relates to butterfly fire dampers for use in air ducts, particularly those which are intended for use as fire, smoke and/or air control dampers and which are intended to automatically move between the open and closed positions in response to the presence of fire or the receipt of a fire or smoke activated signal, and/or to be moved to intermediate positions to allow preselected volumes of air therethrough.

Multiple, folding blade fire dampers having a plurality of blades disposed within a frame having an inwardly depending flange are known in the prior art, as for example, in my U.S. Pat. Nos. 3,814,165 and 3,866,657. In my U.S. Pat. No. 3,899,156, a single blade fire damper is described. In this regard, please refer to U.S. Pat. Nos. 3,009,473 (Hennan); 2,148,530; 3,337,991 (Adams); 3,720,153 (Jardinier et al); French No. 2,307,228 (Barbarin) and my prior U.S. Pat. No. 3,725,972.

The present invention also relates to the field of operators, and more particularly, to the field of damper operators which actuate dampers in response to heat or remote signals but which are immediately resettable immediately after the passage of activation conditions so that they may again respond to fire conditions. The present invention also relates to operators which are adapted to set the position of a damper's blades to regulate the volume of air passing therethrough under normal conditions. Finally, the present invention relates to such operators which may be reset without providing manual access to the vicinity of the damper blades.

Conventionally, fusible or meltable releasing devices have been employed, such as fusible links in cables which are held under tension in normal conditions and which are activated by the melting of the link and the resulting break of the cable to deploy the blades of a fire or smoke damper into their activated positions.

More recently, bimetallic links, such as those illustrated in my previously issued U.S. Pat. Nos. 3,889,314 entitled, "Heat Actuated Link" and 3,725,972 entitled, "Fire Link And Method Of Actuating Same" have been described wherein a mounting element having a bimetallic strip attached thereto, which cooperates therewith, may engage a pawl having an aperture therein which is engaged by a bimetallic element in the normal position, and which is released thereby as the tip of the bimetallic element separates from the striker portion of the mounting element thereof to release the pawl. These bimetallic links have conventionally been installed by attaching a cable to either the pawl, the mounting element, or both, in a manner similar to that used for the fusible or meltable links described above. These bimetallic links have exhibited certain advantages over the prior art fusible links in that following a return to temperatures, the link may be reset by reinserting the pawl into the remaining link assembly.

Unfortunately, prior art devices of the type described above have often required that access be provided to the link device so that manual resetting is possible. In certain installations, such as smoke tunnels, ducts, plenums, etc., human access to reset or replace releasing devices is limited. Additionally, relatively skilled personnel must be employed in order to reset or replace the aforementioned releasing devices. In the case of the bimetallic links, these people must at least understand the proper method of inserting the pawl so that it is properly gripped by the remaining portion of the link.

For one approach to this problem, please refer to my previously issued U.S. Pat. No. 3,796,248, dated Mar. 12, 1974 entitled, "Remotely Resettable Fire Damper".

SUMMARY OF THE INVENTION

The present invention provides a novel butterfly-type damper which has an operator assembly associated therewith which conveniently regulates the volume of air which passes therethrough under normal conditions, but under fire activated conditions, such as excessive heat, reliably causes the closure of the damper blades. The preferred embodiment of the present invention is intended primarily for mounting in the ceiling openings of heat and air conditioning ducts in private, public, and commercial buildings. Heretofore, it has generally been necessary to mount separate fire (or smoke) and volume control dampers in these ducts, each of which would preform its respective function. In order to improve the appearance of the duct opening into the room and in order to improve the dispersant pattern of air emanating therefrom, these fire and air control dampers have conventionally been mounted behind diffusers, as for example, conventional concentric square or round diffusers which establish air patterns within the room to be serviced.

Since most fire and smoke dampers and some air control dampers require manual access thereto in order to reset or adjust those dampers, the resetting of activated fire or smoke dampers and/or the adjustment of volume control dampers has usually entailed at least the removal of the diffuser over the damper opening in order to establish such access. This inconvenience, particularly in large buildings, has tended to make frequent testing of the fire protection apparatus cumbersome, and has additionally tended to inhibit seasonal adjustments of the volume-control apparatus.

The preferred embodiment apparatus of the present invention is a combination volume-control fire damper which is ideally suited for mounting in an opening of a ceiling duct, which opening is covered by a diffuser. In order to operate the preferred embodiment damper of the present invention, only an aperture large enough to receive a screwdriver shaft must be provided in that diffuser. A screwdriver inserted into this aperture is guided into a screwdriver slot, and is used to (under normal conditions) adjust the volume of air permitted to flow through the opening. The damper operator has a heat responsive means associated therewith which may also be remotely activated, to release the blades to cause them to move to their fully closed position. As long as fire actuated conditions, such as excessive heat or the receipt of a remote signal, continue to exist, manipulation of the damper by a screwdriver will not act to reset the same. However, once normal conditions are reestablished, a screwdriver may be used to readily reset the device and then adjust the damper to its desired volume control setting.

The preferred embodiment damper of the present invention comprises a butterfly damper having two blades which are pivotally mounted along a main mounting member which bisects the opening to be serviced. In the closed position, these damper blades cooperate with the frame to fully block the opening in which the damper is mounted. In the open position, the damper blades fold back against each other into positions which are substantially perpendicular to the plane of the damper frame or duct opening.

The preferred embodiment operator assembly of the present invention is mounted between one edge of the frame and a mid-point or other preselected point along the main mounting member of the damper. The operator comprises blade positioning means for establishing the relative positions of those blades with respect to each other and with respect to the damper frame. A heat responsive means is associated with the blade positioning means such that movement of the heat responsive means causes corresponding movement of the blade positioning means to thereby establish the relative positions of those blades. The heat responsive means comprises a latching means capable of selectively engaging a pawl member in response to normal temperature conditions and for releasing said pawl member at least in response to preselected increases in the ambient temperature around said heat responsive means. The operator further comprises such a pawl member which is trackingly mounted on a pawl tracking means for moving and selectively positioning the pawl member along a path defined thereby. Portions of the blade positioning means and pawl tracking means are differentiated into means for limiting the arcuate rotation of the blade positioning means and travel of the pawl member such that under normal temperature conditions, the pawl member may always be moved to reengage the latching means of the heat responsive means to become gripped thereby to thus reset the device. Under normal temperature conditions, subsequent movement of the pawl member along its path of travel causes corresponding movement of the heat responsive means and blade positioning means to establish volume control positioning of the damper blades.

In response to activation by heat or remote signals received by the heat responsive means, the pawl is released by the latching means and the heat responsive means, blade positioning means and damper blades are caused to pivot into their activated positions. The aforementioned stop means defines the point of maximum pivotal displacement of the heat responsive means and blade positioning means. Upon return of normal conditions, the pawl member may be recycled along its track to re-engage the heat responsive means and to thereafter reset the damper blades into their preferred volume control positions.

Accordingly, a primary object of the present invention is the provision of a novel, combination volume control and fire or smoke damper.

Another object of the present invention is the provision of a heat responsive fire or smoke damper which may be concealed behind a conventional diffuser and may be remotely reset, as for example, by a screwdriver inserted through an aperture in that diffuser.

Another aim of the present invention is the provision of a novel operator for volumetrically adjusting a butterfly damper.

Further objects of the present invention will become apparent from the following more detailed description.

DESCRIPTION OF THE PREFERRED EMBODIMENTS

Figure 1:
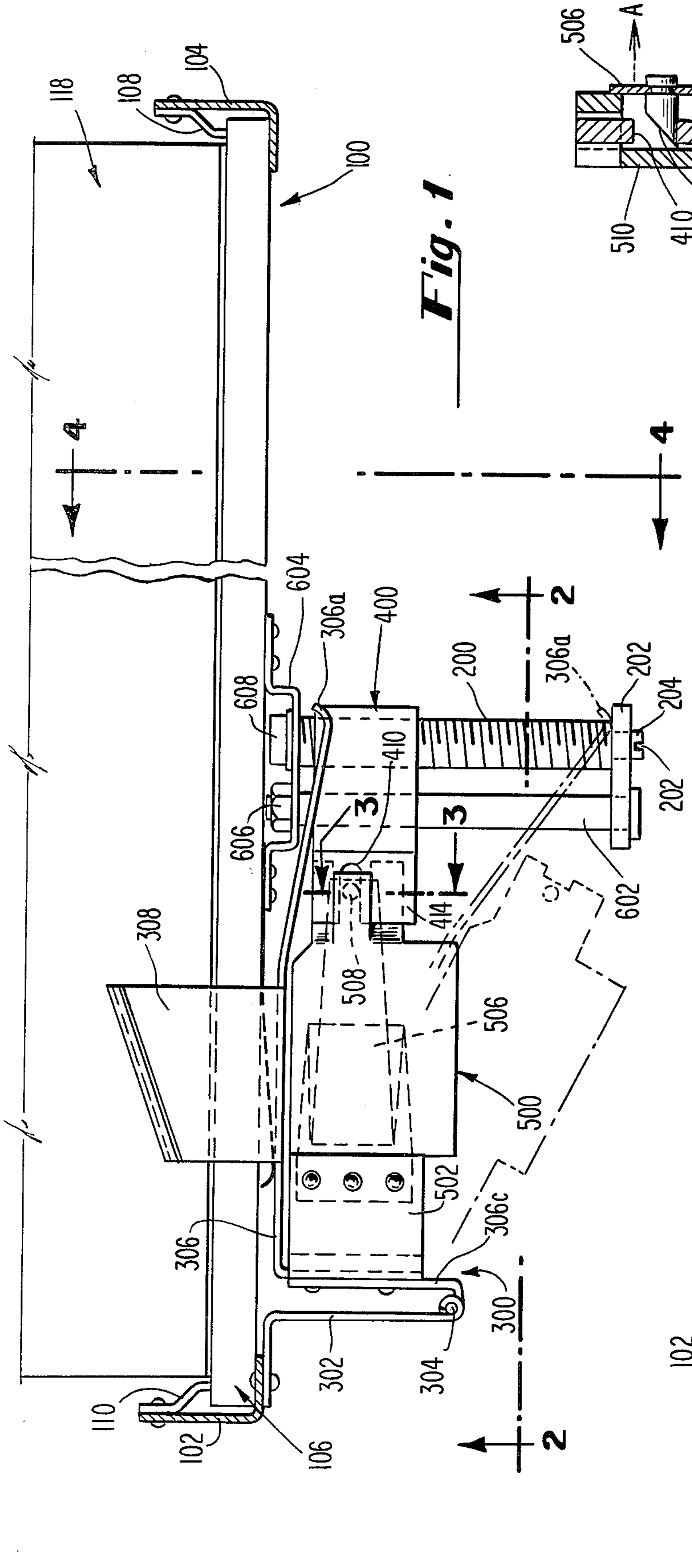
FIG. 1 is a foreshortened cross-sectional side view of the preferred embodiment of the present invention showing the damper blades in their full open position, the activated position of the heat responsive means and a portion of the blade positioning means being shown in phantom in FIG. 1.

Although specific forms of the invention have been selected for illustration in the drawings, and the following description is drawn to specific terms for the purpose of describing these forms of the invention, this description is not intended to limit the scope of the invention which is defined in the appended claims.

While the following description relates in particular to a combination fire and volume control damper, it is within the scope of the present invention to modify the hereinafter described embodiments to become a combination smoke and volume control apparatus, the difference between the two being the final desired activation position of the damper blades. In fire dampers, as described hereinafter, the opening in which the damper is mounted is to be fully closed in response to fire conditions. Smoke dampers, on the other hand, are to be fully opened in response to fire activated conditions. Accordingly, in the hereinafter described combination fire and volume control damper, the blade positioning means and heat responsive means associated therewith are described as being gravitationally biased away from the damper blades so that upon activation, the blades are allowed to move to their fully closed position. By biasing the blade positioning means towards the damper blades, however, activation of the device would cause the blades to move to their fully open position and the damper could thus act as a smoke damper. It is, accordingly, within the scope of the present invention to bias the hereinafter described parts as desired to produce the desired activation position of those parts and, of course, to provide biasing where necessary in order to compensate for different mounting orientations of the device.

Figure 4:
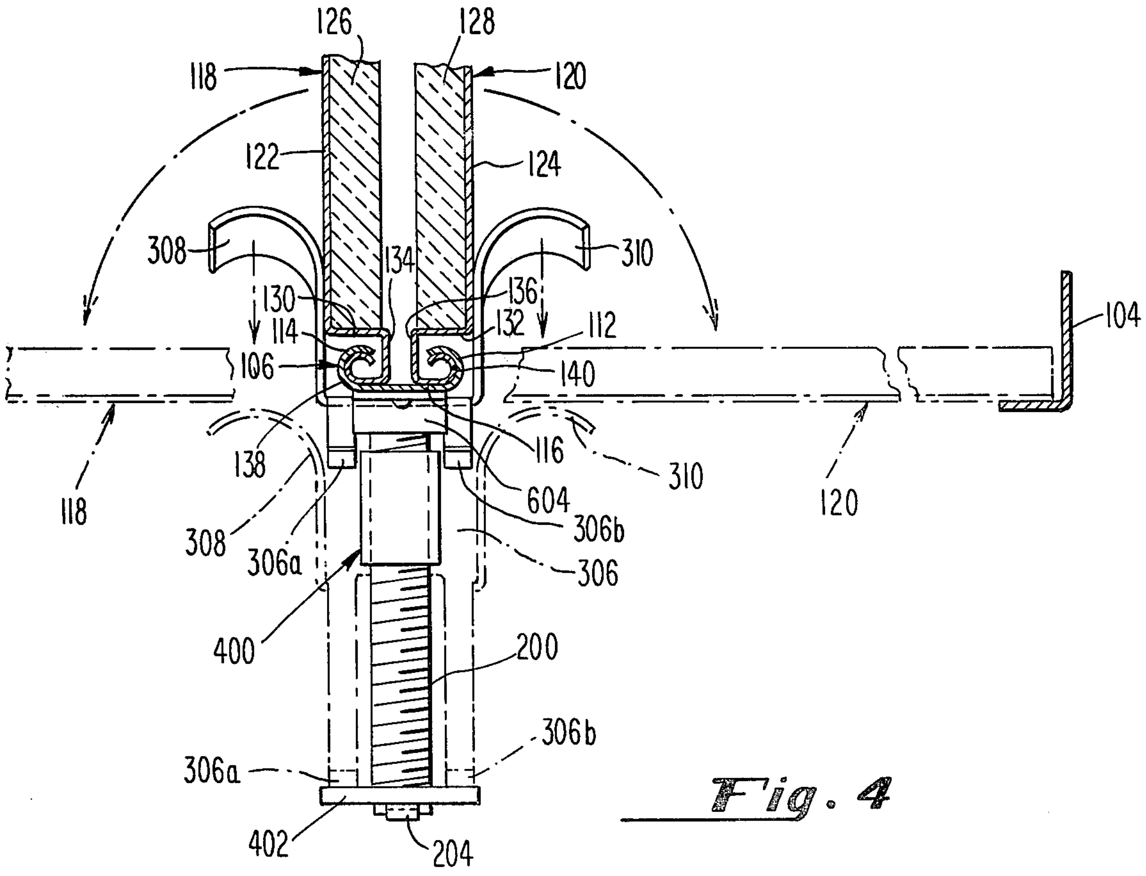
FIG. 4 is a fragmentary cross-section of a portion of the device illustrated in FIG. 1 taken as indicated by the lines and arrows 4—4 in FIG. 1, in which the activated position of the damper blades and operator are shown in phantom.

Referring now to the figures, the butterfly damper designated generally 100 of the present invention illustrated in particular in FIGS. 1 and 4, is similar to that described in my aforementioned patent application entitled "Butterfly Damper" and is seen to comprise frame members 102 and 104 (shown in cross-section) in the figures having main mounting member 106 extending therebetween and held in place with respect to frame members 102 and 104 by main mounting member mounting brackets 108 and 110 which are riveted to portions of frame members 104 and 102, respectively. The main mounting member 106 is defined into two hook-shaped hinge elements 112 and 114 which are joined by a substantially planar immediate portion 116 which forms a mounting surface for a portion of the operator assembly, as described hereinafter. The remainder of the butterfly damper portion of the illustrated apparatus comprises blades designated generally 118 and 120 comprising face portions 122 and 124; offsetting portions 130 and 132; extension portions 134 and 136; and hinge portions 138 and 140, respectively. The blade face portions 122 and 124 are lined with insulating panels 126 and 128, respectively, for creating a substantial temperature barrier when the blades are in the closed position as illustrated in phantom in FIG. 4.

Figure 2:
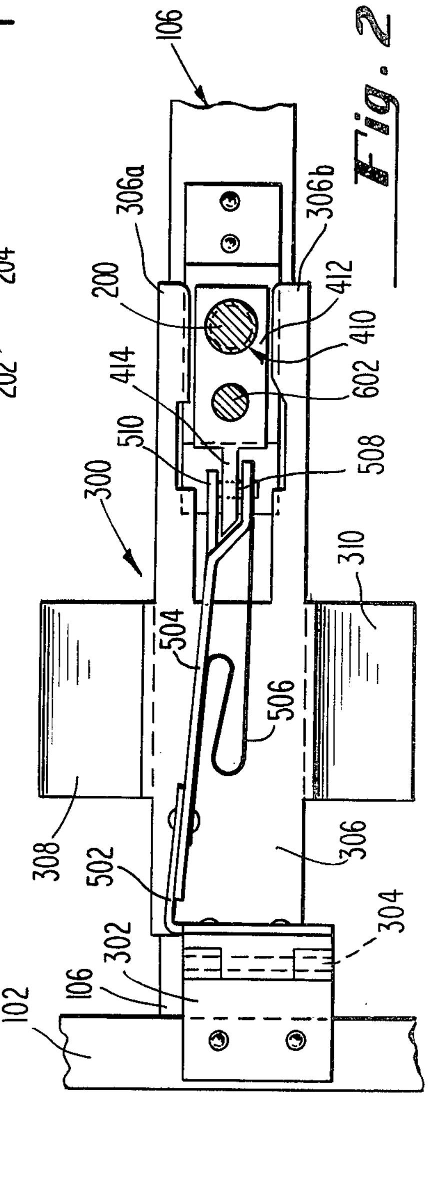
FIG. 2 is a fragmentary cross-section of the device illustrated in FIG. 1 taken as indicated by the lines and arrows 2—2 in FIG. 1.
Figure 3:
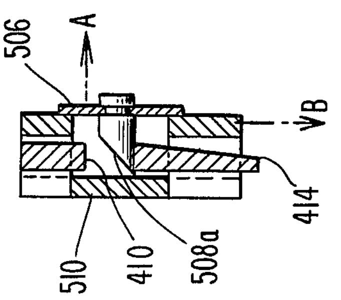
FIG. 3 is an enlarged cross-section of a portion of the device illustrated in FIG. 1 taken as indicated by the lines and arrows 3—3 in FIG. 1.

Referring now in particular to FIGS. 1, 2, and 3, the details of the operator assembly are illustrated. Generally, the operator, designated generally 300 in the drawings, comprises a blade positioning means pivotally mounted with respect to said frame for slidingly engaging portions of the damper blades for establishing the relative positions of those blades with respect to each other and with respect to the damper frame. The operator also comprises a pawl member trackingly mounted on a pawl tracking means for selectively positioning the pawl member at preselected positions therealong. A heat responsive means associated with the blade positioning means and comprising latching means for selectively engaging the pawl member in its preselected position along said tracking means and for releasing said pawl member at least in response to preselected increases in the ambient temperature around said heat responsive means is provided, the relative location of said pawl member and its engagement under normal conditions by said heat responsive means establishing through said blade positioning means the relative position of the blade with respect to the damper frame.

As illustrated in the figures, the blade positioning means comprises a blade positioning base bracket 302, which is riveted at its proximate end to a flange formed on frame member 102 and is configured at its remote end to form a portion of a hinge 304, the axis of which is substantially parallel to the plane of the damper frame, but is offset from that plane by a distance approximately equal to one half of the length of threaded shaft 200. The blade positioning means further comprises an "L" shaped blade positioning mounting plate 306 comprising a base portion 306*c* which is pivotally attached to base bracket 302 by the aforementioned hinge 304. The blade positioning mounting plate has rounded blade positioning wings 308 and 310 extending away therefrom to form a channel therebetween having substantially greater entrance distances therebetween near the tips thereof. Near their intersection with blade positioning mounting bracket 306, wings 308 and 310 are substantially parallel to each other so that in the position illustrated in FIGS. 1 and 4, the blades 118 and 120 will be held in the full open position. The curved portions of blade positioning wings 308 and 210 are sloped, as seen particularly in FIG. 1, so that upon pivoting of the blade positioning means to the position shown in phantom in FIG. 1, the surfaces of these wings which engage the faces of the blades, as shown in particular in FIG. 4, will be maintained substantially parallel to the pivotal axes of those blades. Blade positioning mounting plate 306 is differentiated at its remote end into two terminal stop portions 306*a* and 306*b* which flank pawl member 400 on either side and which interfere with pawl track stop plate 402 when the blade positioning means is in its activated position. This interference between terminal stop portions 306*a* and 306*b* and pawl track stop plate 402 prevents the blade positioning mounting plate 306, and thus the heat responsive means designated generally 500 mounted thereon from moving past a predetermined arc of pivotal rotation which might otherwise exceed the tracking distance of the pawl member.

The heat responsive means, designated generally 500, basically comprises a heat responsive means mounting bracket 502, a mounting element 504 connected thereto and a serpentine bimetallic element 506 mounted thereon. In addition to offsetting hinge 304 away from the plane of the damper frame, the base portion 306*c* of blade positioning mounting plate 306 provides a base for the attachment of heat responsive means mounting bracket 502 such that mounting element 504 and bimetallic element 506 are oriented in a plane which is generally perpendicular to the plane of the damper frame, that is, within the plane of pivotal movement of blade positioning mounting plate 306. The configuration of the bimetallic element 506 and mounting element 504 as illustrated in the drawings is similar to that disclosed in my prior issued U.S. Pat. No. 3,889,314 entitled, "Heat Actuatable Link". Although less preferred, it is also within the scope of the present invention to substitute therefore a device in accordance with that disclosed in my prior issued U.S. Pat. No. 3,725,972, entitled, "Fire Link And Method Of Actuating Same." It is also within the scope of the present invention to substitute an alternatively heat responsive means, as disclosed in my aforementioned U.S. Pat. No. 4,195,384 entitled, "Self-Resetting, Cable Operated Translating Drive Link."

The heat responsive means also comprises latching means for selectively receiving and gripping the pawl member. The latching means basically comprises portions of the mounting element 504, pin 508, slot 410 and the blade portion 414 of pawl 400. As shown in the drawings, the tip of the bimetallic element 506 has mounted thereon a pin 508, which engages a striker portion 510 of mounting element 504 under normal temperature conditions. When pin 508 is engaging striker portion 510, it is capable of assuming the solid line position shown in FIG. 1 wherein the remainder of the heat responsive means and blade positioning means are restrained relative to the pawl by reason of the interference of pin 508 with the interior surfaces of slot 410, which is defined in pawl member 400. The pawl member, designated generally 400, comprises a central tracking block portion 412 having a blade portion 414 extending away therefrom within which the aforementioned pawl slot 410 is defined.

As shown particularly in FIG. 3, the blade portion 414 of the pawl member, designated generally 400, is bevelled towards its lower-most edge to cooperate with a complementally formed bevel **508*a* formed on the end of pin 508. These bevels facilitate the resetting of the device by causing the end of pin 508 to ride up over the surface of blade 414 until it moves over slot 510 to snap into the position shown in FIG. 3**.

In response to a preselected increase in ambient temperature, the bimetallic element 506 will be caused to deform to withdraw pin 508 out of slot 510 by moving in the direction of arrow A in FIG. 3. This will allow the heat responsive means and blade positioning means associated therewith to drop in the direction of arrow B shown in FIG. 3 into the phantom line activated position shown in FIGS. 1 and 4 of the drawings.

Figure 5:
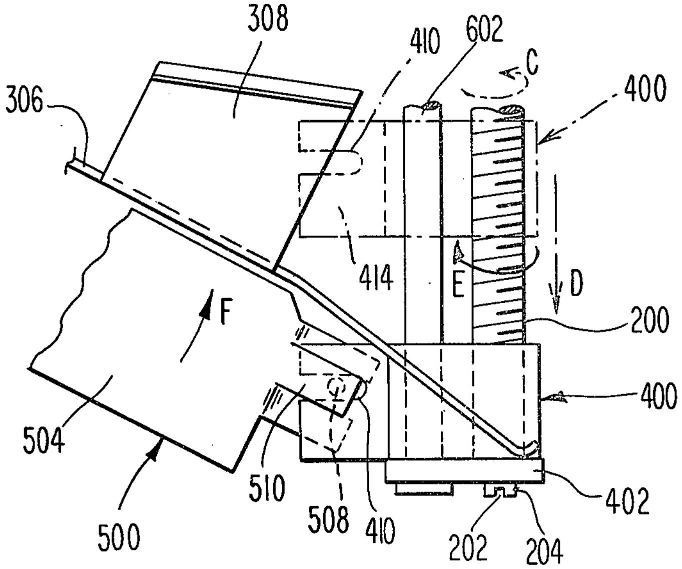
FIG. 5 is an enlarged fragmentary side view of a portion of the device illustrated in FIG. 1 representing the resetting of the device through movement of the pawl between the phantom lined position and the solid lined position shown in FIG. 5.

The pawl member, designated generally 400, is trackingly mounted along a pawl member tracking means for selectively moving said pawl member between and maintaining said member in any of a variety of preselected positions along a path defined thereby. The pawl member tracking means basically comprises a threaded shaft 200 and a guide shaft 602 which extend generally perpendicularly away from main mounting member 106 to thereby define an axis of reciprocal movement along which the pawl may travel. The pawl member tracking means is mounted to the main mounting member 106 of the damper by a pawl track mounting bracket 604 which is riveted to the mounting surface of main mounting member 106, as shown in the drawings. Guide shaft 602 is bolted to bracket 604 by bolt 606, whereas a bearing 608 is provided to facilitate the rotation of threaded shaft 200 therearound. At their remote ends, guide shaft 602 and threaded shaft 200 cooperate with pawl track stop plate 402, which maintains the spacing of these shafts while acting as a natural maximum limiting plate for pawl member 400, as well as for interfering with terminal portions **306*a* and 306*b* of blade positioning mounting plate 306. In FIG. 1, the damper blades and main mounting member are foreshortened. In the preferred embodiment of this invention, however, the threaded shaft 200 is disposed substantially at a mid-point along main member 106 so that a concentric diffuser mounted therebelow may have as its natural center point a screwdriver access aperture which will guide a screwdriver inserted therethrough so that it engages screwdriver slot 202 in shaft head 204. It is within the scope of the present invention, however, to locate threaded shaft 200 at a point along mounting bar 106 which is not at the mid-point of that bar, provided, however, sufficient access is provided for a means for causing the rotation of shaft 200. The pawl block portion 412 of the pawl member is mounted to slidingly engage the exterior surfaces of guide shaft 602 and threaded shaft 200. Upon rotation of threaded shaft 200, the pawl will, of course, be caused to move along the pawl tracking means to assume the desired position therealong. Referring now in particular to FIG. 5, portions of the blade positioning means and heat responsive means are shown in their activated position. Upon return of normal temperatures, pin 508 will have assumed a position where it is in contact with a surface of striker portion 510 of the mounting element 504 and will thus be ready to receive blade 414 of pawl 400 to re-engage and grip the pawl through interference of the pin 508 with the interior surfaces of slot 410. Rotation of threaded shaft 200 in the direction of arrow C in FIG. 5 will cause the pawl member to move from the phantom position shown in FIG. 5 in the direction of arrow D. Continued rotation of shaft 200 will move the pawl member into contact with pin 508 so that the bevelled blade will engage and force the pin to slide over the exterior surface of the blade until the pawl has been moved into the solid lined position shown in FIG. 5, whereupon the pin 508 will snap into slot 410. By providing a slot in blade 414, rotation of threaded shaft 200 in the direction of arrow E shown in FIG. 5 to thus cause the pawl member to move towards the phantom lined position will enable the heat responsive means to pivot along the arc of arrow F shown in FIG. 5. Pin 508 during the movement of pawl member 400 will accordingly ride within the slot and, in fact, reciprocate within the slot as the pawl is moved into the "full open" position shown in FIGS. 1 and 4**.

From the above description, it will be seen that a simple, reliable volume and smoke/fire damper is provided which is responsive to fire activated conditions and which, after those conditions have passed, may easily be reset from a remote location, as for example, from the other side of a ceiling diffuser behind which the damper and operator are concealed. Further, remote activation may be provided, particularly when the device is used as a smoke damper, by providing electrical or pneumatic activation of the heat responsive means as detailed more fully in my above-mentioned patent applications and patents. Accordingly, the preferred embodiment device of the present invention is efficient and economical, while nonetheless providing superior smoke/fire protection without sacrificing volume control performance.

It will be understood that various changes in the details materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. An operator for use with a damper having a frame and at least one pivotally mounted blade dimensioned to abutt said frame, said blade being movable between open and closed positions with respect to said frame, said operator comprising:

(a) a pawl member associated with said frame, (b) blade positioning means for positioning said at least one blade relative to said frame, said blade positioning means having an end pivotally mounted adjacent to said frame and a free end extending to a position adjacent said pawl member; and (c) heat responsive means having a fixed portion mounted adjacent to said frame and a free portion positioned relative to said pawl member and said free end of said blade positioning means for retaining said pawl member and said blade positioning means in an attached position for operatively moving said blade during normal conditions, and releasing said pawl member and said blade positioning means to an unattached position for releasing said blade in response to a preselected increase in ambient temperatures.

2. The invention of claim 1, wherein said pawl member is mounted for movement through a variety positions with respect to said frame.

3. The invention of claim 2, wherein said heat responsive means is mounted on said blade positioning means for pivotal movement therewith.

4. The invention of claim 3, wherein said blade positioning means is gravity biased away from said attached position in response to said releasing of said pawl member from said blade positioning means.

5. The invention of claim 3, wherein said pawl member and said blade positioning means are reassembled under said normal conditions by moving said pawl member into alignment with said blade positioning means.

6. The invention of claim 5, wherein said blade moves to said closed position as said blade positioning means moves from said attached position.

7. The invention of claim 6 wherein said blade is caused to open as said blade positioning means moves into said attached position.

8. The invention of claim 2, wherein said pawl member is mounted on a pawl member tracking means, said pawl member tracking means being affixed to said frame for moving said pawl member through said variety of positions with respect to said frame.

9. The invention of claim 8, wherein portions of said blade positioning means and said pawl member tracking means further comprise means for limiting the arc of relative pivotal displacement of said blade positioning means in at least one direction.

10. The invention of claim 8 wherein said pawl member tracking means comprises at least one shaft journaled within a bore defined in said pawl member.

11. The invention of claim 10 wherein said shaft is threaded within said bore.

12. The invention of claim 10 wherein said tracking means comprises a plurality of shafts journaled within a plurality of bores defined in said pawl member.

13. The invention of claim 2, wherein said attached position is maintained under normal conditions during the movement of said pawl through said variety of positions.

14. The invention of claim 13, wherein movement of said pawl member through said variety of positions acts through said blade positioning means to adjust to relative position of said blade with respect to said frame.

15. The invention of claim 14, wherein said heat responsive means further comprises latch means for slidably interconnecting said pawl member to said blade positioning means.

16. The invention of claim 15 wherein said pawl member has a slot defined therein and said latch means comprises a pin for engaging the interior surfaces of said slot.

17. The invention of claim 1, wherein said blade positioning means comprises at least one blade positioning wing for a slidably engaging said at least one blade.

18. The invention of claim 17, wherein said wing comprises an arcuate, sloped portion for engaging said at least one blade along an axis which remains substantially parallel to a pivotal axis of said blade as said blade is allowed to pivot therearound during the pivotal displacement of said blade positioning means.

19. The invention of claim 1 wherein said heat responsive means comprises a bimetallic element.

20. The invention of claim 19 wherein said element is a serpentine bimetallic element.

21. A damper operator for use with a damper comprising a frame and at least one blade pivotally mounted on said frame for movement between opened and closed positions with respect to said frame, said damper operator comprising:

(a) blade positioning means pivotally mounted with respect to said frame for engaging at least one blade for moving said blade between said opened and closed positions;

(b) means for defining the arc of rotation of said blade positioning means, said arc of rotation corresponding to the movement of at least one blade in response thereto between said opened and closed positions;

(c) a pawl member mounted for reciprocal movement with respect to said frame;

(d) heat responsive means connecting said blade positioning means to said pawl member in response to normal conditions for retaining said at least one blade in a first position and for disconnecting said pawl member from said blade positioning means in response to increases in ambient temperature to release said blade positioning means from engagement with said blade, whereby said blade is free for unrestrained movement;

(e) pawl tracking means for selectively moving and maintaining said pawl member through a variety of positions between said opened and closed positions, and further including a reconnection position where, under normal conditions, said heat responsive means reconnects said pawl member with said blade positioning means.

22. The invention of claim 21 wherein said pawl member further has at least one slot defined therein and said heat responsive means comprises latching means for, under normal conditions, receiving and engaging interior surfaces of said one slot.

23. The invention of claim 22 wherein said slot and said latching means are configured to enable movement of said pawl member to produce pivoting of said heat responsive means and said blade positioning means, whereby said movement of said pawl member adjusts the degree of opening of said blade with respect to said frame.

24. The invention of claim 23 wherein said blade positioning means comprises at least one blade positioning wing for slidingly engaging the face of said blade.

25. The invention of claim 24 wherein said damper comprises a plurality of blades and wherein said blade positioning means comprises a pluraltiy of wings, at least one for each blade, for slidingly engaging the faces of said blades.

26. A damper operator for use with a damper comprising:

(a) a frame and two blades pivotally disposed for movement with respect to a main mounting member on said frame for movement between opened and closed positions with respect to said frame;

(b) blade positioning means pivotally mounted with respect to said frame for engaging said blades for moving said blades between said opened and closed positions, wherein said blade positioning means further comprises blade positioning wings, one for each of said blades, for movement on generally opposing sides of said main mounting member for moving said blades towards their opened positions;

(c) a pawl member mounted for reciprocal movement with respect to said frame; and (d) heat responsive means connecting said blade positioning means to said pawl member in response to normal conditions for retaining said blades in a first position and for disconnecting said pawl member from said blade positioning means in response to increases in ambient temperature to release said blade positioning means from engagement with said blades, whereby said blades are free for unrestrained movement.

27. The invention of claim 26 wherein said blade positioning wings have substantially arcuate sloped portions, said portions being configured to engage the faces of said blades along lines substantially parallel to the axis of rotation of said blades as said blade positioning means is pivoted with respect to said blades.

28. The invention of claim 27 wherein said blade positioning means pivots within a plane which is substantially parallel to the axis of rotating of said blades.

29. The invention of claim 28 wherein said pawl member is reciprocally moveable along an axis which is substantially perpendicular to the plane of said blades in the closed position.

* * * * *